US008488483B2

(12) United States Patent
Österling et al.

(10) Patent No.: US 8,488,483 B2
(45) Date of Patent: Jul. 16, 2013

(54) METHOD FOR A RADIO BASE STATION AND A RADIO BASE STATION IN A COMMUNICATION NETWORK SYSTEM FOR ASSISTING IN OR OBTAINING ASSISTANCE IN THE UL RECEPTION OF SIGNALS

(75) Inventors: Jacob Österling, Järfälla (SE); Franz Heiser, Järfälla (SE); Henrik Olson, Spånga (SE); Fredrik Huss, Sundbyberg (SE); Pontus Adolfsson, Vallentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 364 days.

(21) Appl. No.: 12/882,348

(22) Filed: Sep. 15, 2010

(65) Prior Publication Data

US 2012/0063294 A1     Mar. 15, 2012

(51) Int. Cl.
*H04B 7/208* (2006.01)
(52) U.S. Cl.
USPC .......................................... 370/252; 370/344
(58) Field of Classification Search
USPC .................... 370/252, 319, 343, 344, 480
See application file for complete search history.

(56) References Cited

U.S. PATENT DOCUMENTS

| | | | | |
|---|---|---|---|---|
| 2010/0091702 A1* | 4/2010 | Luo et al. | | 370/328 |
| 2011/0243085 A1* | 10/2011 | Seo et al. | | 370/329 |
| 2012/0113816 A1* | 5/2012 | Bhattad et al. | | 370/246 |
| 2012/0231739 A1* | 9/2012 | Chen et al. | | 455/41.2 |

OTHER PUBLICATIONS

International Search Report mailed on Aug. 1, 2011 in corresponding International Application No. PCT/SE2010/050990.
Huawei; "HARQ Operation for uplink CoMP"; 3rd Generation Partnership Project (3GPP) TSG Ran WG2 Meeting #67; R1-094790; Aug. 24-28, 2009; pp. 1-6.Shenzhen, China.
Erik Dahlmann, et al.; "3G Evolution: HSPA and LTE for Mobile Broadband passage"; 3G Evolution HSPA and LTE for mobile Broadband, Academic Press; XP002591334, ISBN 978-0-12-374538-5; Jun. 1, 2009; pp. 490-495; Elesevier, NL.
Dahlmann, et al.; "3G Evolution HSPA and LTE for Mobile Broadband, The Uplink transmission scheme"; 3G Evolution HSPA and LTE for mobile Broadband, Academic Press; XP002615771, ISBN 978-0-12-374538-5; Jan. 1, 2008; pp. 383-387; Elesevier, NL.

(Continued)

*Primary Examiner* — Kerri Rose
(74) *Attorney, Agent, or Firm* — Potomac Patent Group, PLLC

(57) ABSTRACT

In cellular radio systems it is a problem to provide service to UE (user equipment) on the cell border. In systems that apply a frequency re-use of one, and OFDM access technology, the uplink direction need be improved. One embodiment of this application relates to a radio base station that is equipped with one or more FFT processor/s in addition to the FFT-processor that is adapted for being adjusted to the timed aligned arrival of signals from UE served by the radio base station. The additional FFT processor/s is adapted for being adjusted to the arrival of one or more signals from UE that are served by other radio base station/s. The radio base station is further adapted to send Fourier processed signal information relating to the UE of the other radio base station/s and thereby assist the other radio base station in signal reception. The application also relates to a method for assisting another radio base station in signal reception, and to a method for receiving assistance from another radio base station in signal reception.

25 Claims, 14 Drawing Sheets

OTHER PUBLICATIONS

Huawei; "RAN2 considerations for coordinated multipoint transmission and reception"; 3GPP TSG-RAN WG2 meeting #66; 3rd Generation Partnership Project (3GPP); R2-093107; May 4-8, 2009; pp. 1-5; XP050340849; San Francisco, CA, USA.

Huawei; "Discussion on Timing Advance issue in CoMP & Test Proposal"; 3 GPP TSG RAN WG1 meeting #56; 3rd Generation Partnership Project (3GPP), R1-090823; Feb. 9-13, 2009; XP050318679; Athens, Greece.

Itri, et al.; Timing-advance issue in uplink CoMP; 3 GPP TSG RAN WG1 meeting #57; 3rd Generation Partnership Project (3GPP), R1-091718; May 4-8, 2009; pp. 1-4; XP050339251; San Francisco, CA, USA.

Deutsche Telekom Ag; "Coordinated link adaptation based on multi-cell channel estimation in the LTE-A uplink"; 3GPP TSG RAN WG1 Meeting #59; 3rd Generation Partnership Project (3GPP); R1094595; Nov. 9-13, 2009; pp. 1-6; XP050389006; Jeju, South Korea.

Written Opinion of the International Searching Authority mailed on Aug. 1, 2011 in corresponding International Application No. PCT/SE2010/050990.

* cited by examiner

METHOD FOR A RADIO BASE STATION AND A RADIO BASE STATION IN A COMMUNICATION NETWORK SYSTEM FOR ASSISTING IN OR OBTAINING ASSISTANCE IN THE UL RECEPTION OF SIGNALS

TECHNICAL FIELD

The present invention relates to radio communication in a cellular network and to a method for a radio base station to assist a neighbour radio base station in signal reception, to a method for a radio base station to obtain assistance form a neighbour radio base station in signal reception and to a radio base station adapted to perform any of the two methods.

BACKGROUND eUTRAN also referred to as LTE is a radio communications network standardized by 3GPP. The LTE radio base station provides communication services to mobile terminals over a common frequency carrier. Use of the frequency carrier is shared among the active mobile terminals in a cell supported by the radio base station. In LTE the radio base station is named eNodeB and the mobile terminal is named User Equipment UE.

A principle for LTE is that the radio communication with a UE is performed over one radio base station, as is contrary to systems that employ soft handover. The radio access technology is OFDM, which supports communication with plural UE at the same time with separate sub-carriers of the frequency carrier temporary assigned to the different UE. Timing of the uplink transmission from the UE is carefully controlled by the eNodeB because interference between the UE can only be avoided when the signals from the different UE are received time aligned at the radio base station.

FFT (Fast Fourier Transformation) processors are very well suited for receiving OFDM signals, and, albeit also other type of processors for Fourier processing may be used, the FFT processor is one reason why the OFDM technology has been chosen for the LTE as well as for other radio communication systems such as Wimax. One FFT processor receives time domain signal samples of the frequency carrier and transforms it into frequency domains samples. In the frequency domain it is easy to filter sub-groups of sub-carriers that have been used by different UE for transmitting information to the radio base station. The radio base station can thereby easily separate the frequency domain samples from different UE and then process the separate signals such as making channel estimation for each of them.

In cells controlled by different radio base station it is intended to have a frequency reuse of one, meaning neighbouring cells will use the same frequency carrier. Communication is sometimes difficult when the UE is located at the cell edge. The uplink, UL, direction, from the UE to the radio base station is the most troublesome owing to the UE transmit power is limited. Moreover, for small cells such as micro, pico or femto cells that are covered by a larger cell, the UE power is intentionally limited in order decrease the interference caused in the overlapping cell. In discussions on the scope of 3GPP release number 10 it has been proposed that a radio base station may request a neighbour base station to assist in receiving the signals from a UE on the cell edge. The assisting neighbour base station shall then provide the requesting radio base station with information received over the air from the UE on the cell edge, such as frequency domain samples from the Fourier processing of the frequency carrier as produced when detecting the UE in its own cell. This works well when the radio base station are located at a site distance up to about 500 m, because then the UE signals received whether produced in the own cell or in the cell controlled by the close distance radio base station will be received time aligned and be possible to detect within the frequency domain samples. Signals from UE at larger distance in other cells will mostly arrive non-aligned with the signals from UE in the own cell and then just appear as interference in the frequency domain samples and will not be detectable. Communication with UE on the cell border is nevertheless troublesome also when the radio base station has no neighbour at close distance.

SUMMARY

A problem addressed is detection of signal from UE on the cell border in cells that are of medium or larger size, i.e. that are of a radius of 500 m or more.

One aspect of the solution is a method in a radio base station of assisting one or more neighbour radio base stations in UL signal reception and comprises the steps of:

Serving a first group of UE with communication over a frequency carrier.

Controlling the timing of signal transmission from the first group of UE, to be aligned at arrival at the radio base station.

Fourier processing time domain signal samples of the frequency carrier, with the timing of the Fourier processing adjusted to the arrival of signals from the first group of UE, and thereby producing Fourier processed signal samples relating to the first group of UE.

Receiving a request from one of said neighbour radio base stations to provide Fourier processed signal information relating to a second group of one or more UE that is/are served by the requesting radio base station, and wherein the signals from the second group UE arrive/s non-aligned with the signals of the first group of UE at the radio base station.

Fourier processing time domain signals of the frequency carrier with timing adjusted to the arrival of signal/s from the second group UE, and thereby producing Fourier processed signal information relating to the second group of UE.

Sending the Fourier processed signal information that relates to the second group of UE to the requesting neighbour radio base station.

Another aspect of the invention is a method for a radio base station of obtaining assistance from a neighbour radio base station in receiving a signal from one or more UE, and that comprises the steps of:

Serving a first group of UE with communication on a frequency carrier.

Controlling the timing of signals from the first group of UE to be aligned at arrival at the radio base station, by sending a timing alignment commend to any UE in the first group whose signal arrives misaligned.

Fourier processing the signals on the frequency carrier, with timing adjusted to the arrival of signals from the first group of UE, thereby producing Fourier processed samples relating to the first group of UE.

Sending a request to the neighbour radio base station to provide Fourier processed signal information relating to a second group of UE which comprises one or more UE of the first group. The request includes at least one of:
an indication of the timing of arrival of the signals from the second group UE at the neighbour radio base station UE specific properties of the signal/s transmitted from the second group UE Receiving from the neighbour radio base station Fourier processed signal information relating to the second group UE.

Estimating the information bits transmitted from the second group UE based on the Fourier processed signal information received and based on the Fourier signal information as produced in the radio base station.

Yet a further aspect of the invention is a radio base station for assisting a neighbour radio base station in UL signal reception. The radio base station comprises: a radio receiver, a radio transmitter, a processor connected to the radio transmitter and to the radio receiver and when run by a computer program configured to support communication with a first group of UE over a frequency carrier and control the timing of arrival of signals from the first group of UE by sending timing alignment command to any UE whose signal arrives misaligned at the radio base station. The processor and/or one or more further processors is/are equipped with software and when run on the processor/s they are operable to:

Fourier processing samples of the frequency carrier with timing adjusted to the arrival of the timed aligned signals of the first group of UE.

Fourier processing samples of the frequency carrier with timing adjusted to the arrival of signals from the second group UE, in response to a request from the neighbour radio base station, wherein the signals from the second group UE arrive non-aligned with the signals of the first group of UE.

Sending to the neighbour radio base station Fourier processed signal information relating to the second group UE.

An advantage provided by these embodiments is signals from UE on the cell border can be decoded and loss of connection to the UE is avoided.

A further advantage provided with specific embodiments of the present invention is signals from a plurality of UEs whose signal arrives at separate times at an assisting radio base station can be Fourier processed by the assisting radio base station with a number of Fourier processors much less than the number of arrival timings, if the scheduling to different time slots is planned carefully. Thereby signal detection can be improved for a plurality of UE at low cost in terms of complexity in the assisting radio base station.

DETAILED DESCRIPTION

Figure 1A:
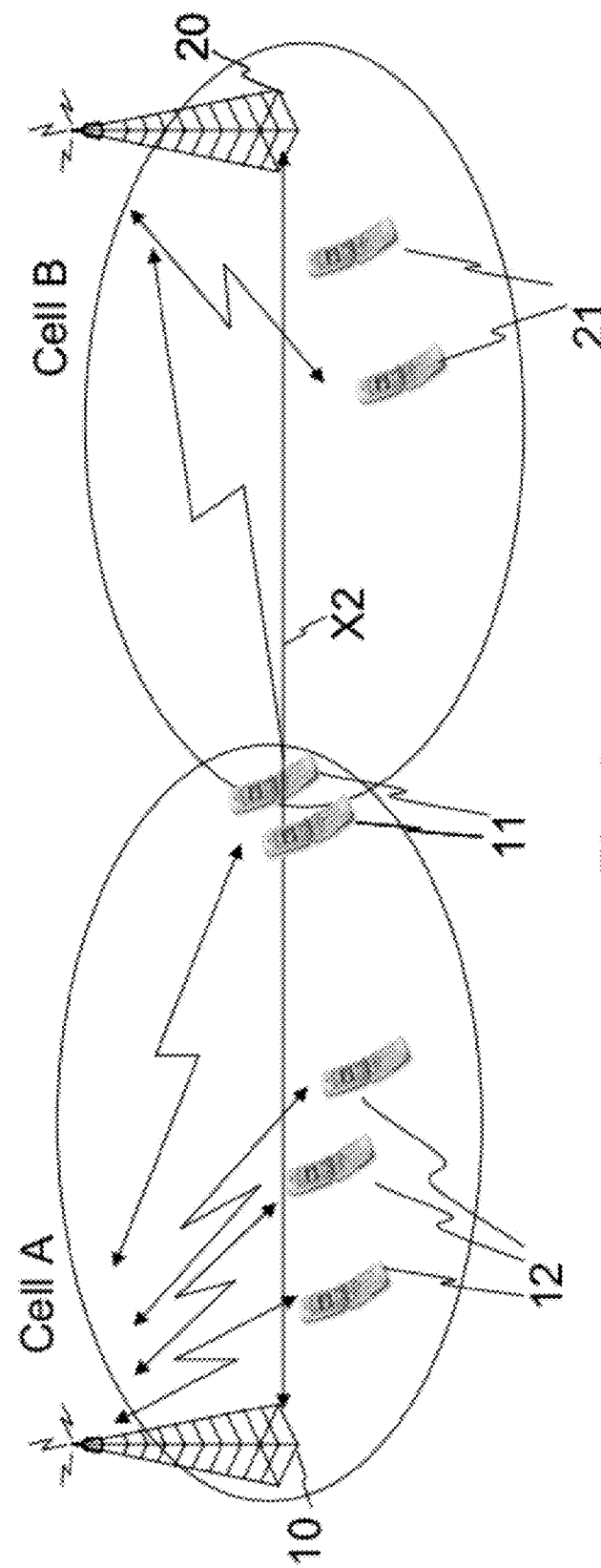
FIG. 1a and FIG. 1b are views over radio base stations, UE and cells.

FIG. 1 depicts a view of a simplified communication system with two cells A, B each served by a radio base station 10, 20. The radio base stations are connected to each other via a network. X2 is the name of the protocol used for communication between eNodeB in the LTE system. An LTE network comprises a plurality of eNodeB each serving one or more cells. A simplified LTE radio access network has the structure as depicted in FIG. 1a, albeit, many more radio base stations are included and they also have connections to core network. FIG. 1 does not disclose the connection to the core network as it is not of importance for the invention. Any radio communication with this or similar structure may employ the solutions that will be demonstrated in the following. Though the embodiments disclosed are made with illustration in the LTE system it should be understood that the solutions are not limited to implementation in that system, since also other systems with similar architecture, such as Wimax may advantageously make use of the solutions.

Each of the radio base stations 10, 20 has the capacity to serve a number of mobile terminals, and that are named UE (User Equipment) in this description, with communication. The radio access technology is OFDM and that employs a frequency carrier that is shared among UE that are active in communication. The radio base stations 10, 20 provide communication to active UE within its own cell, and that covers a geographical area. When a UE, such as UE11 in FIG. 1a, is moved out of the coverage area from one of the cells, such as cell A served by a first radio base station 10, and there is another cell neighbouring cell A, such as cell B in FIG. 1a, a handover procedure should be performed where the responsibility for the communications with UE11 is shifted from the first base station 10 to the base station 20 serving cell B. The handover shall be initiated when cell B is estimated to provide a defined quality level and that is in most cases at least as good as that provided in cell A. With FIG. 1a as an illustrative example, handover from one cell to another may take place before the quality of the communication in the first cell has become poor. For some cells in a network there may however not be a good quality candidate cell for the handover of a UE when the quality of the communication with the UE is impaired. If that is the situation in cell A when UE11 is close to the cell border, the communication is improved by an embodiment of the invention wherein the radio base station controlling the communication in cell A will request the radio base station 20 that controls communication in cell B to assist in receiving the signal from the cell border UE11. The neighbour base station 20 need be specially adapted to be able to assist. In order to ease the description of the adaptation of the radio base station, the OFDM signal generation and receiving in general will first be discussed.

Figure 2A:
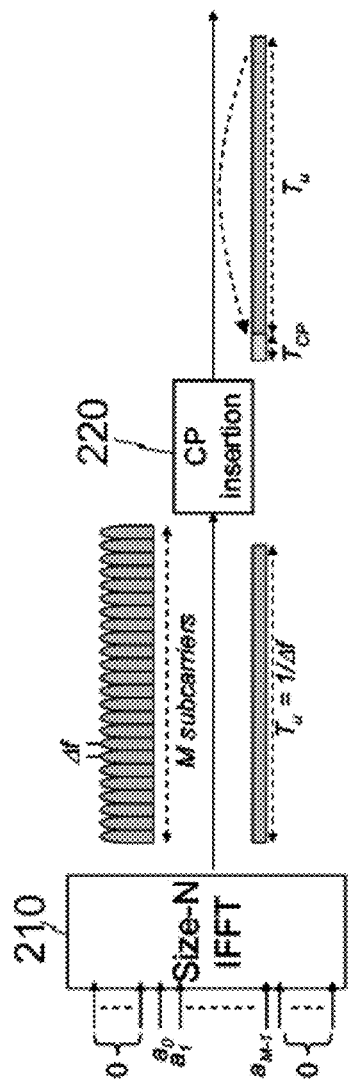
FIGS. 2a and 3a are block diagrams of an OFDM modulator.

FIG. 2a is a functional block diagram of the basic principle of the OFDM modulation, also illustrating the signal thereby produced. It comprises an IFFT (Inverse Fast Fourier Transformation) processor 210 of size N, followed by a block 220 for inserting a cyclic prefix. The IFFT has N parallel inputs and to which M modulation symbols, $a_0$-$a_{M-1}$, are fed in parallel. M is less than N and zeros are fed to IFFT inputs that do not receive a modulation symbol. The IFFT produce at its output a number of sub-carriers each carrying one of the OFDM symbols over a OFDM symbol interval $T_u$, with $T_u=1/\Delta f$ where $\Delta f$ is the sub-carrier spacing. The last part of the OFDM symbol is copied and added as a cyclic prefix at the beginning of the OFDM symbol interval. Thereby the OFDM symbol interval is prolonged and thereby becomes robust to time dispersion on the signal path between the radio base station and the UE. After D/A conversion the OFDM signal is radio transmitted.

Figure 2B:
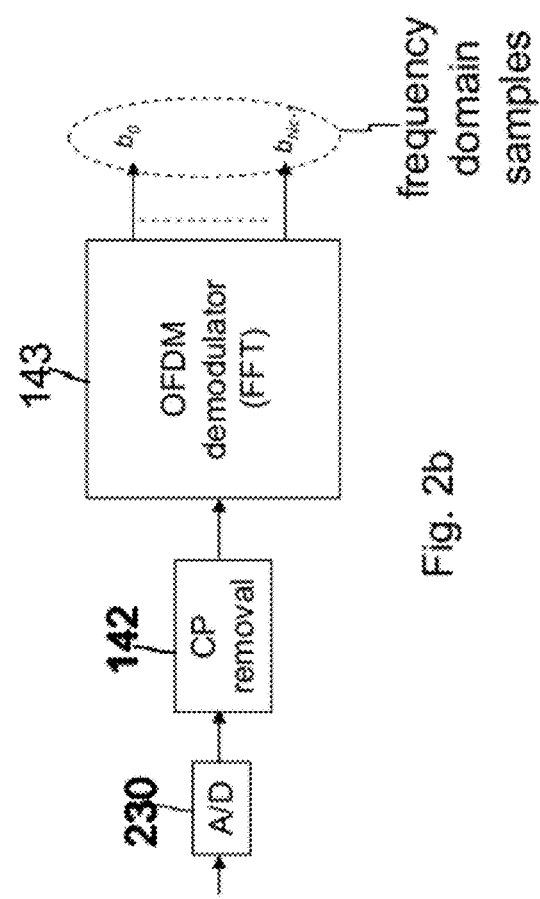
FIGS. 2b and 3b are block diagrams of an OFDM demodulator.

A functional block diagram of the OFDM signal receiver function is disclosed in FIG. 2b. It comprises an A/D converter 230, a cyclic prefix remover 142, and FFT (Fast Fourier Transformation) processor 143 that functions as an OFDM demodulator. The FFT processor 143 receives the time domain samples of the OFDM frequency carrier, i.e. the radio samples made over the whole frequency carrier, with the cyclic prefix removed from the OFDM symbols. The FFT processor 143 integrates the energy over the whole OFDM symbol interval $T_u$ and its start of processing must be adjusted in time to the start of the OFDM symbol interval $T_u$. The FFT processor 143 produces frequency domains samples $b_0$-$b_{N-1}$ at its parallel outputs where the outputs correspond to the various sub-carriers of the frequency carrier.

At OFDM modulation, the number M of modulation symbols, $a_0$-$a_{M-1}$, may correspond to the number of sub-carriers on the frequency carrier or it may be lower number and then only some of the sub-carriers will be used. By selecting which of the parallel inputs on the IFFT processor 210 the modulation symbols are fed to, the corresponding frequency carriers are selected for carrying the modulation symbols. This facilitates the assignment of different sub-carriers to different UE. In the uplink direction, transmission on the frequency carrier will be made by plural of the active UE on separate sub-carriers and the UE need control their signals being modulated onto the right sub-carriers. Moreover, the signals from the various UE need be received by the radio base station 10, 20 aligned in time. Signals are considered to be time aligned when the maximum misalignment between the signals is that of the cyclic prefix length. In LTE that is in the order of 4 μs.

Figure 3A:
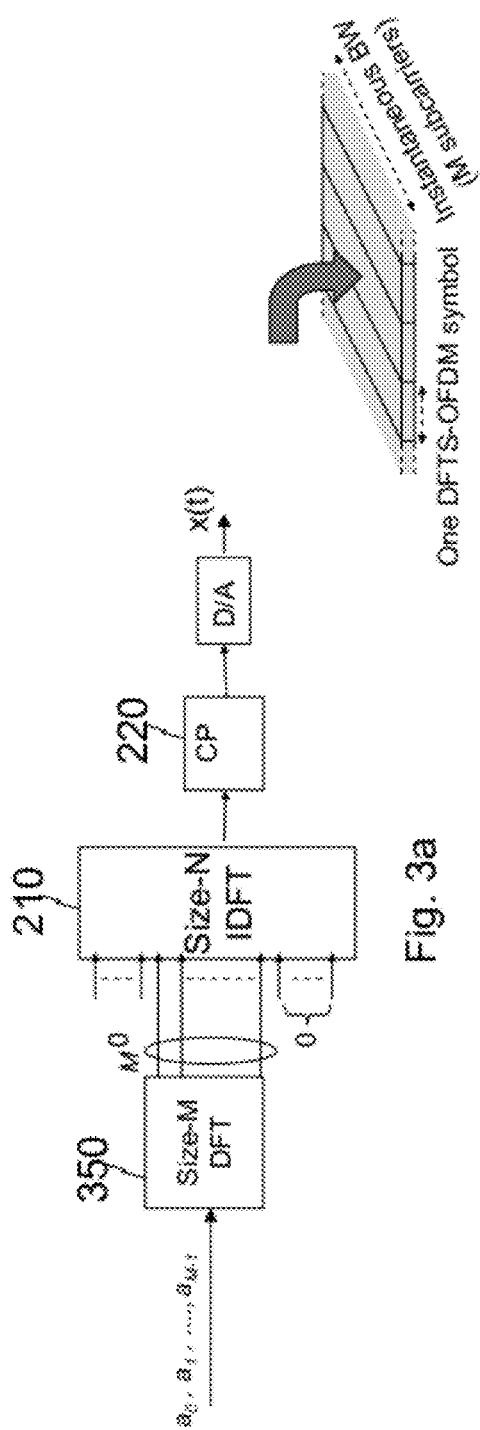
Figure 3B:
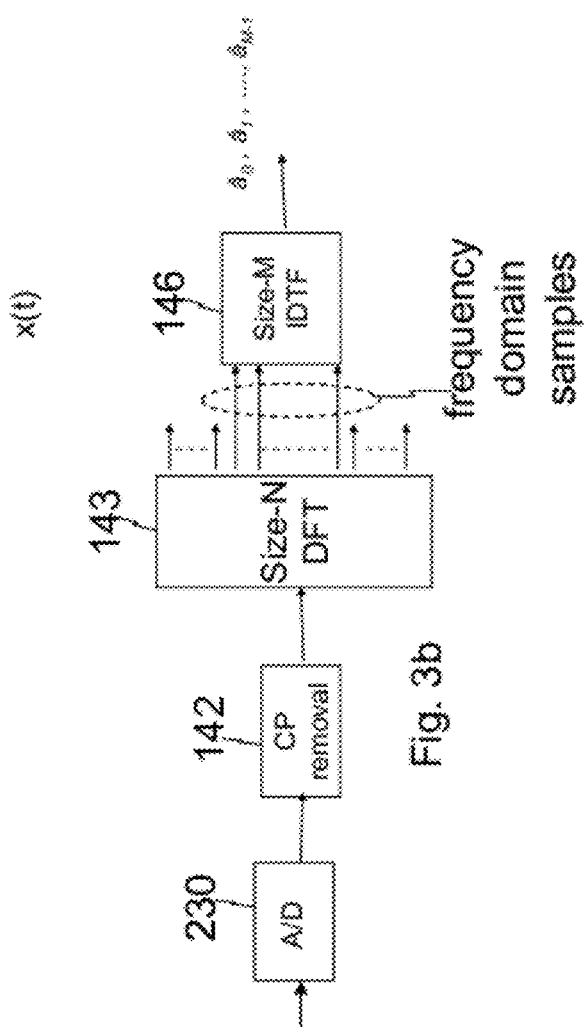

On the UL for LTE the OFDM modulation is a special type called DFT-spread OFDM. The DFTS-OFDM modulator is depicted with a block diagram in FIG. 3a, and a block diagram of the DFTS-OFDM demodulator is depicted in FIG. 3b. The DFTS-OFDM modulator comprises the same parts as the OFDM modulator in FIG. 2b with addition of a DFT (Discrete Fourier Transformation) processor 350 that precodes the M modulation symbols, $a_0$-$a_{M-1}$, before they are fed to the IDFT processor 210. Also the DFT-OFDM demodulators differs from the general OFDM demodulators by the addition of a IDTF (Inverse Discrete Fourier Transformation) processor 360 that decodes the frequency domain signals at the FFT processor 143 output. The result of the DFT precoding is the output signal has single-carrier property with low power variation and with a bandwidth that depends on the number M of modulation symbols transmitted. Low power dynamic is important for the UE implementation. Whether basic OFDM or DFT spread OFDM modulation is used or solutions of the present invention can be applied, which of them is used is of less importance for the implementation of the solutions.

It should be noted that when the OFDM modulators and demodulators are described above it has been made with implementation by UFFT processors simply because this is the most common form of implementing Fourier processing for OFDM signals, there is however nothing that prevents other types of Fourier processing to be performed. Though a processor specialized for discrete signal processing is advantageous to use there is nothing that prevents a general purpose processor from being used for the Fourier processing. Also analogue Fourier processing would provide the same result, however, for implementation reasons less preferred, while yet possible to use.

With reference to FIG. 1a, the first of the radio base stations 10 serve a first group of UE, 11, 12, with communication in cell A, and controls their transmission timing by sending a time alignment command to any of the UE 11, 12, whose signal arrive at the radio base station 10 misaligned in time with the signals from the other UE 11, 12. Thereby the first radio base station can OFDM-demodulate the signal from all UE it serves in the same FFT processor 143. The first radio base station 10 has difficulty in detecting the UL signal from UE 11 on the cell edge, and estimates or takes a chance that one of plural neighbour base station may receive the signal from the cell edge UE 11. The first radio base station 10, then send a request to the neighbour base station, 20, to provide Fourier processed signal information that relates to the cell edge UE 11. If the neighbour base station 20 approves of assisting the first radio base station, it sends Fourier processed signal information that the first radio base station use for improving the detection of the signal from the cell edge UE, 11.

The same procedure albeit seen from the perspective of the radio base station that provides assistance to the first radio base station 10 will now be described with reference to FIG. 1a and to the flow chart of FIG. 5. Also the second radio base station, 20, serves, 410, a first group of UE, 21, with communication. Notably in the terminology used in this description the first group of UE, 21, as seen from the perspective of the second radio base station, 20, comprises other UE than the first group of UE, 11,12, as seen from the perspective of the first radio base station, 10.

The second radio base station, 20, controls, 420, that the signals transmitted from the first group UE, 21, are received time aligned by sending a timing alignment value to any of the first group UE whose signal arrive mis-aligned. A single FFT process is run, 430, with timing adjusted to the arrival of the signals from the first group UE, 21, and that OFDM demodulates the signals from the first group of UE, 21. So far this is the normal continuous process of a LTE radio base station.

Then the radio base station, 20, receives, 450, a request from its neighbour base station, 10, to assist by providing frequency processed signal information relating to a second group UE, 11, that is on edge of cell A and close to Cell B that is served by the neighbour base station, 20. The second group UE, 11, may comprise one or more UE, 11.

In parallel to the FFT processing, 430, of the signals from the first group of UE, 21, FFT processing 470 is also performed with timing adjusted to the arrival of the second group UE.

In the last step the radio base station 20 send 490 the Fourier processed signal information, relating to the second group UE, 11, to the requesting radio base station 10.

Figure 1B:
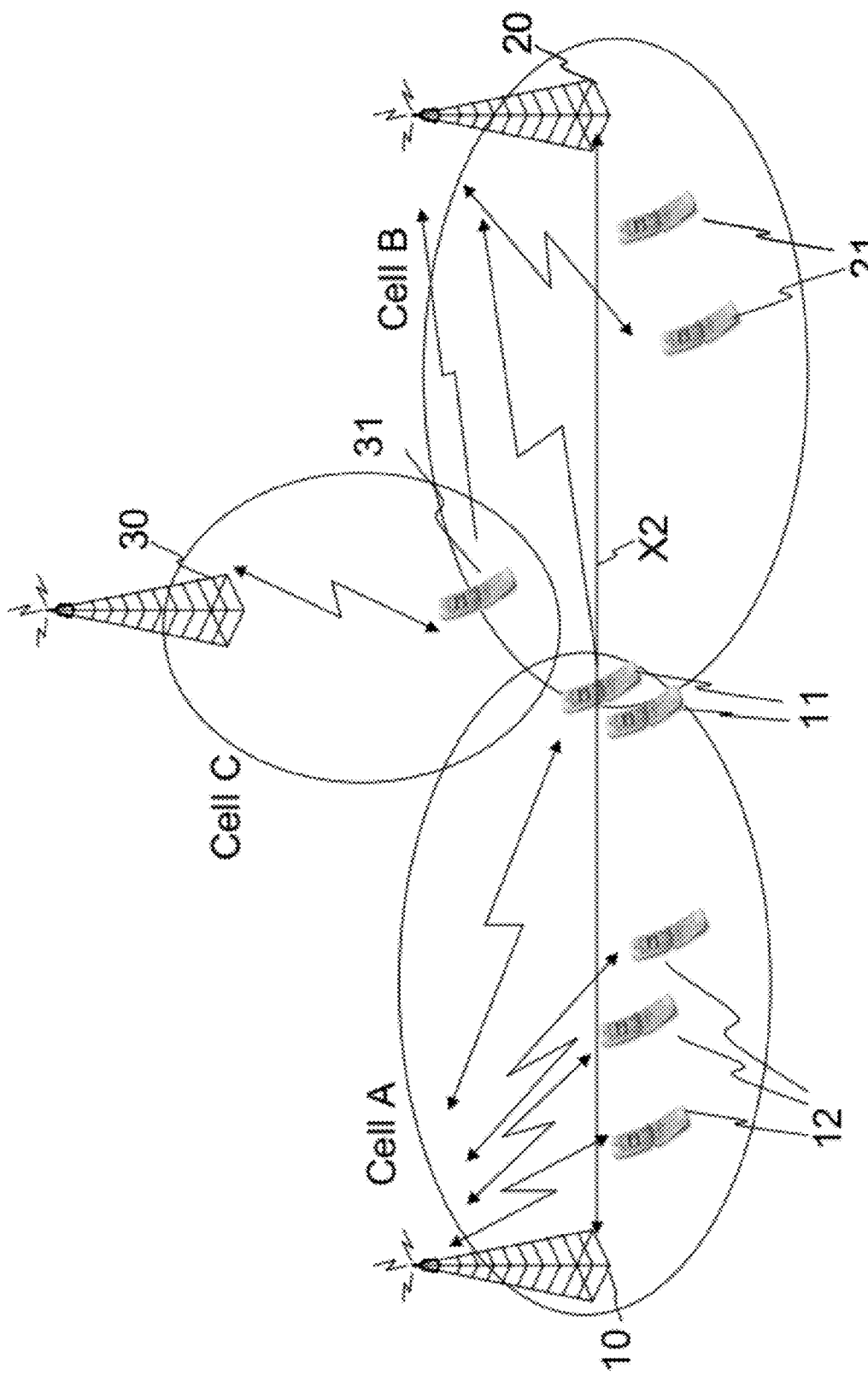

FFT processing of signals from the second group UE continues in the second radio base station, 20, unless the request as received included an instruction to assist for just a period of time or unless a later request is received and that includes an instruction to cease Fourier processing of second group UE, 11. Further requests to provide FFT signal information relating to further UE of the second group may also be received either from the same neighbour base station, 10, that sent the first request or from any other radio base station, 30, such as that serving UE, 31, in cell C as depicted in FIG. 1b. It should thereby be understood that the second group UE, 11, 31, may comprise plural UE and that may be served by different of the neighbouring radio base stations, 10, 30, that request assistance. The signals received from the second group UE may also arrive at different timing at the assisting radio base station, 20, since they may be located at different distances from the assisting radio base station 20, and their transmission timing is controlled by one or more other radio base station 10, 30, than the assisting radio base station 20. Thereby the second group UE 11,31 differs from the first group UE 21 that are served by the radio base station 20, and whose transmission timing are also controlled by the radio base station 20, that acts as an assisting radio base station in relation to the second group UE 11, 31.

Figure 4:
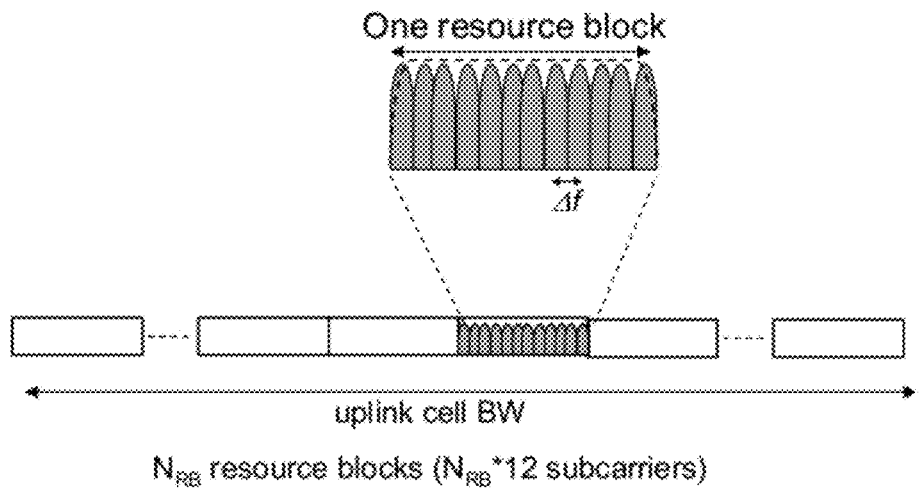
FIG. 4 is an illustration of resource blocks in the frequency domain.

Before the details relating to adjusting the FFT processing to the diverse arrival timings of signals from the second group UE 11, 31 will be further explained and discussed, scheduling shall here be discussed. Scheduling is the process in a radio base station 10, 20, 30 of selecting UE that are assigned parts of the frequency carriers for a short period. In LTE the scheduling is made for blocks of two time slots, and that corresponds to a transmission time interval TTI of 1 ms. A new scheduling decision is thus made each 1 ms. In the frequency domain, resource blocks of 12 sub-carriers are the granularity units possible to assign to the UE. In the UL the LTE UE can only be assigned several resource blocks within one TTI if they are continuously placed in the frequency plane. Typically when a scheduling decision is made not all active UEs are assigned resource blocks, and some then have to wait till a later TTI before being assigned any resource blocks on the frequency-carrier. FIG. 4 illustrates the UL OFDM carrier bandwidth in the frequency domain and its partition into resource blocks of 12 subcarriers, and that makes number $N_{RB}$ resource blocks in total over the OFDM carrier bandwidth.

Figure 6:
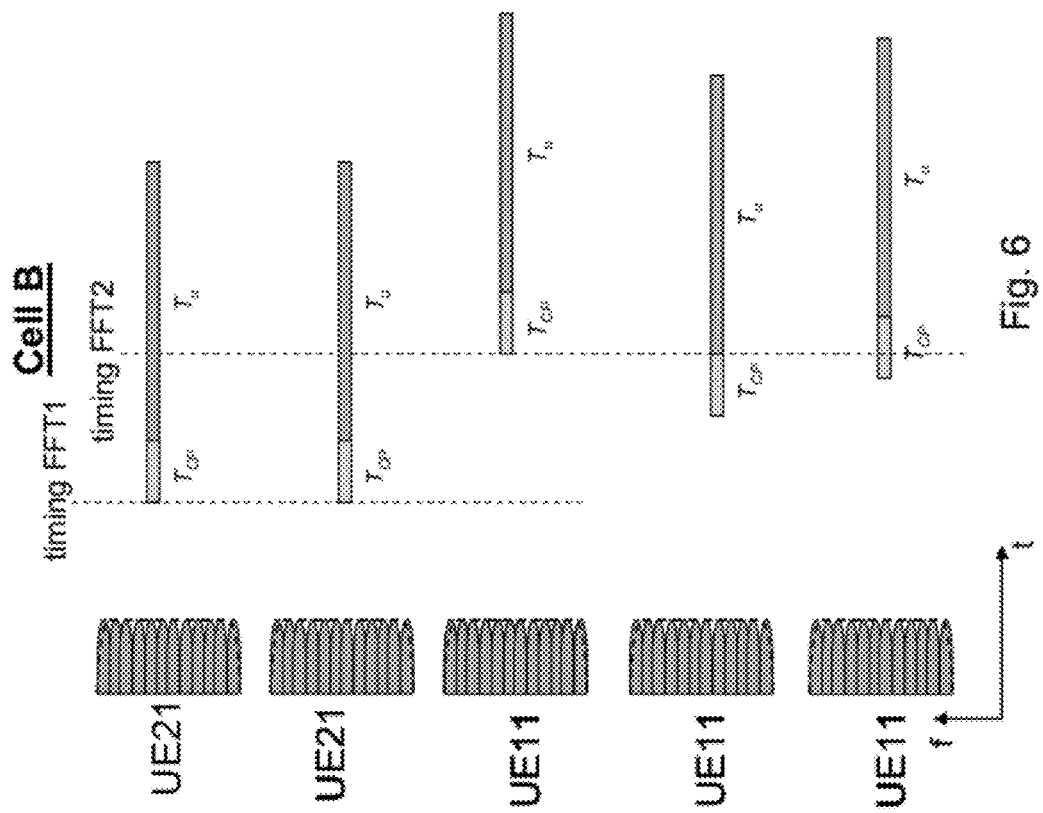
FIG. 6 and FIG. 7 are illustrations in a time frequency domain, illustrating arrival timings of signals from various UE.

FIG. 6 is an illustration in the time frequency domain of the time of arrival of signals received in cell B by the radio base station 20 when assisting in receiving signals from a second group UE 11 that are served by the first radio base station 10 in cell A. For simplifying the illustration, the first group UE 21, have been assigned other resource blocks in the frequency domain for the exampled TTI, than the second group UE 11. It should however be understood that they may be assigned to the same physical resource blocks by their respective serving radio base station, 10, 20. The signals from the first group UE 21 arrive mutually well aligned in time and the timing of a first FFT processor (FFT1) is adjusted to their arrival timing. The signals from the second group UE 11 also arrive at the assisting radio base station 20 mutually time aligned. As depicted in FIG. 6 there is a small deviation in the arrival timing, however, as long as the maximum difference in arrival time is that of the cyclic prefix $T_{CP}$ the signals can be demodulated by the same FFT processor and are considered to be time aligned. Two FFT processes with a specific start time each are thus required in the example of FIG. 6 for demodulating the OFDM signals from the first group UE 21 and from the second group UE 11.

Figure 7:
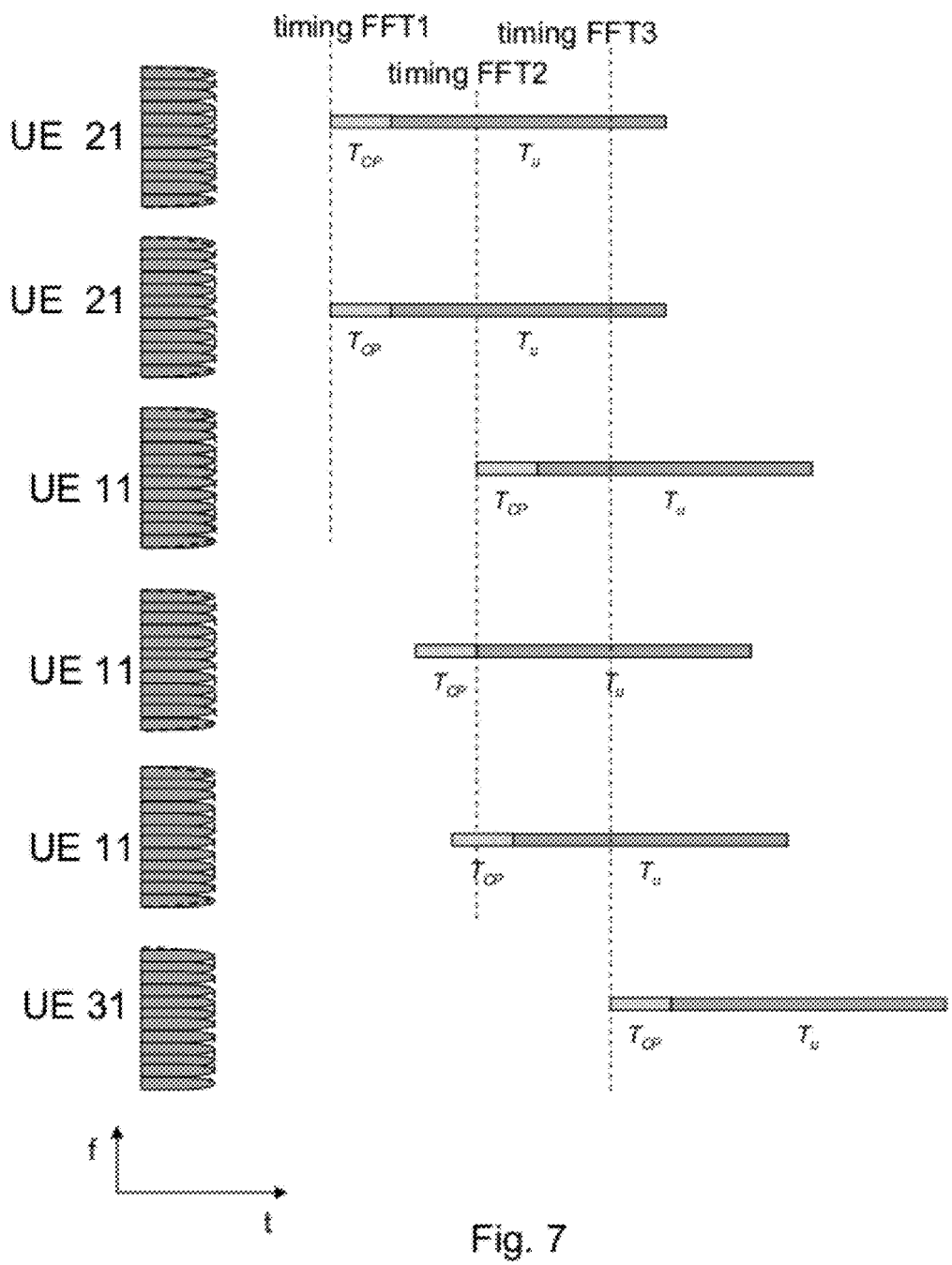

Since the arrival timing of the second group UE 11 is adjusted to fit in the serving cell, and not in the assisting cell the arrival timings may relate to several timing-sub-groups, with one or more of the second group UE 11 in each timing-sub-group. Also if the second group UE 11, 31 are located in different cells such as cell A and Cell C, the number of timing-sub-groups is likely to be plural. FIG. 7 is the same time frequency diagram as FIG. 6 depicting for illustration an example with the second group UE 11, 31 being associated with two timing-sub-groups, one which the signals from the second group UE 11 located in cell A arrive within, and another which signals from the second group UE served by cell C will arrive within. The radio base station 20 therefore needs two Fourier processes for OFDM decoding signals in cell B that are transmitted from UE 11, 31 that are located in neighbour cells A and C.

Figure 8:
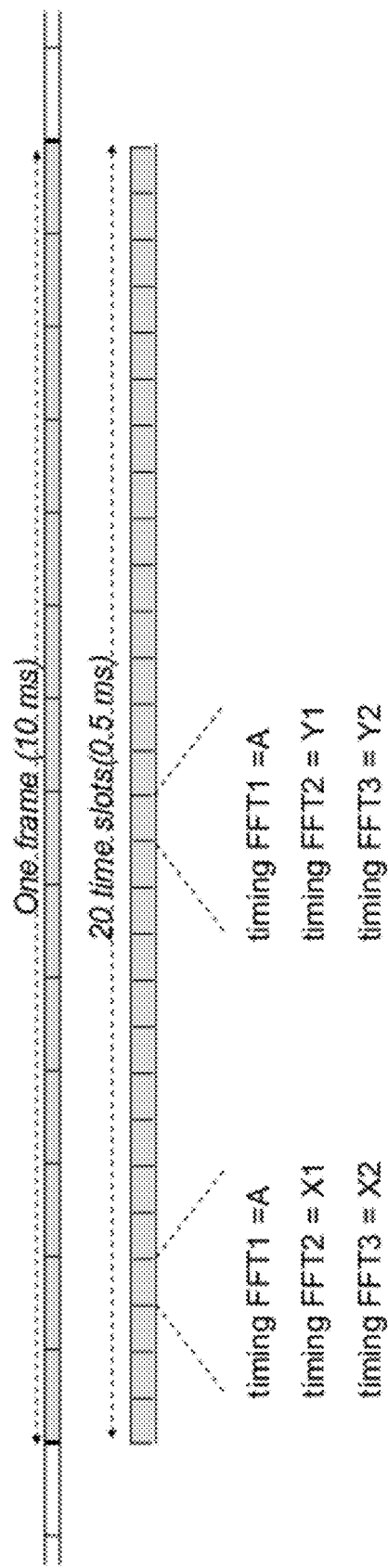
FIG. 8 is an illustration of a time frame along a time axis.

The number of timing-sub-groups related to the second group UE 11, 31 may rapidly increase with the number of UE that the radio base station 20 are requested to assist and with the number of radio base stations 10, 30 requesting assistance. The number of Fourier processes made in the same time slot should preferably be restricted to a pre-defined number because of its computation complexity. In combination with planned scheduling over the subsequent time slots a restricted pre-defined number of Fourier processes may serve many more timing-sub-groups of second group UE, 11, 31. FIG. 8 is a time diagram disclosing a frame structure of 10 ms that is divided into 20 time slots of 0.5 ms each. As discussed above scheduling is performed for a TTI of 1 ms and that comprises two time slots. The numbered time slot numbers are repeated in each frame. In the assisting radio base station 20, the Fourier processing optionally may be assigned to start at different timing in the different TTI, i.e. time slots, and thereby produce Fourier processed signal samples of second group UE relating to different timing sub-groups. The neighbour radio base stations 10, 30 either instruct or are informed by the assisting radio base station 20 of the Fourier processing timing in the different time slots. The neighbour radio base station 10, 30 will then schedule the cell border UE 11, 31 in the UL only in time slots in which the Fourier processing in the assisting radio base station 20 is adjusted to their time of arrival in cell B. The radio base station 10, 30 that need assistance shall thereby group the UE 11, 31 in relation to their signals arrival timing in cell B, and schedule UE that relate to the same timing-sub-group in the same time slots. With the example disclosed in FIG. 8, the assisting radio base station 20 has capacity for performing 3 Fourier processes on samples received in the same time slot. One of them is assigned for processing the first group UE 21 and it is started at time A in all time slots that has been scheduled in the UL for any of the first group UE 21. The other two Fourier processors are respectively started at time X1, and X2 in a first time slot and respectively at time Y1, and Y2 at a second time slot. When the neighbour base stations 10, 30 possess information of the Fourier processing timing in the different time slots of the assisting radio base station 20, they will optionally schedule those of the second group UE 11, 31 whose arrival time at the assisting radio base station 20 corresponds to these Fourier processing timings. The number of Fourier Processes needed to assist neighbour radio base stations, 10, 30, relates to the planning of the systems, such as the number of neighbour radio base stations, and of the topography. Based on computer simulations it is expected that a number of about four would provide a good result.

Figure 9:
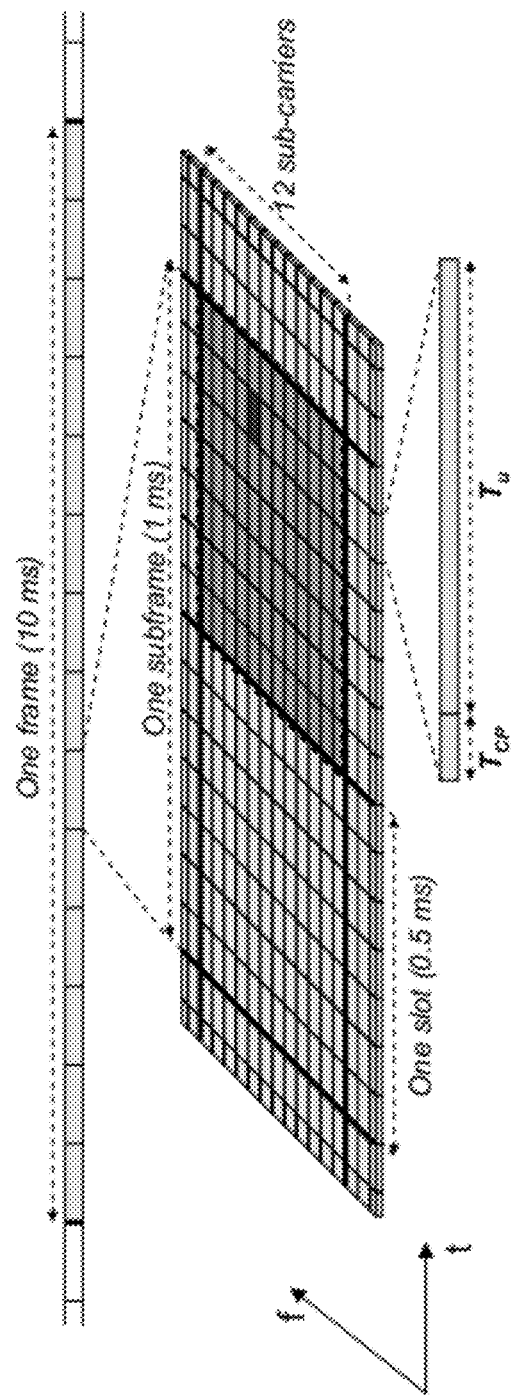
FIG. 9 is the illustration of a time frame from FIG. 8 with addition of an illustration of part of the structure applied to the frequency carrier along a time axis and a frequency axis.

FIG. 9 at its top discloses the same frame structure as depicted in FIG. 8. Under the frame is illustrated one of the sub-frames and part of the frequency carrier during this sub-frame. Along the frequency axis is depicted 12 sub-carriers, and that for the period of one time slot constitutes a physical resource block. Two physical resource block are the smallest granularity of what may be scheduled to one UE, 11, 21, 31, in the LTE system. In the figure is also illustrated that two time slots are grouped into one sub-frame and that corresponds in time to one TTI, and that each time slot comprises seven subsequent modulation symbol $T_u$ and cyclic prefix $T_{CP}$ periods. It should be understood that when the FFT processing is adjusted to a specific time this is made for a period of a sub-frame and applies to all the 14 OFDM symbol intervals that follows. The Fourier processing is made per OFDM symbol interval $T_u$. For the next sub-frame the FFT processing timing may be adjusted.

The control of the timing of the Fourier processing for the second group UE 11, 31 may be within the assisting radio base station 20, within the radio base station 10, 30, requesting assistance or be distributed between the assisting radio base station 20, and the base station 10, 30, requesting assistance. Estimation of the time of arrival of signals from the second group UE 11, 31, at the assisting radio base station 20, may be performed in the assisting radio base station 20, in the radio base station 10, 30, requesting assistance or be made in cooperation between the two function radio base stations 10, 20. The more of the estimation of the time of arrival of signals that is made in the assisting radio base station 20, the more of the control of the timing of the Fourier processing is preferably also made in the assisting radio base station, 20. The requesting radio base stations 10, 30 should be informed of which of the timing-sub-groups the UE 11, 31 relates to, and in which time slots the respective UE 11, 31 should be scheduled if assistance is not possible in all time slots. Several alternative options and combinations are feasible, and some alternatives will be exemplified with reference to the flow chart in FIG. 10 and that relates to the steps performed in the assisting radio base station, and that in the example corresponds to the second radio base station 20. A flowchart for the method steps in a radio base station 10, 30 that receives assistance will be explained further down.

Figure 5:
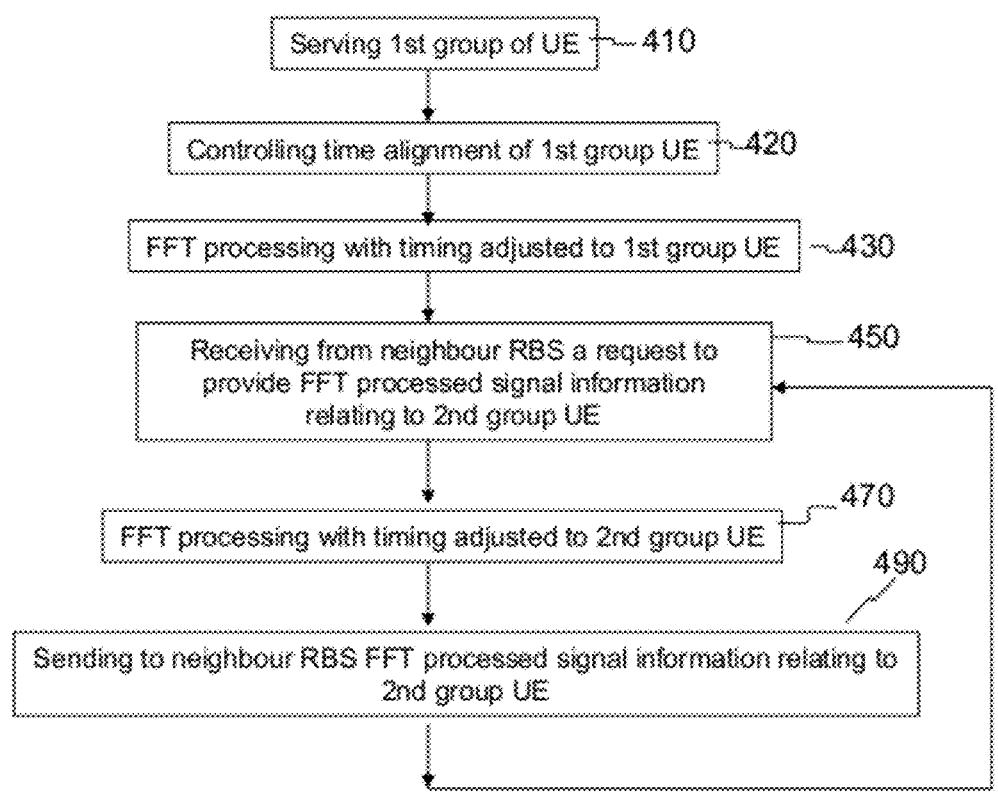
FIG. 5 is a flow chart of a method as performed in an assisting radio base station.
Figure 10:
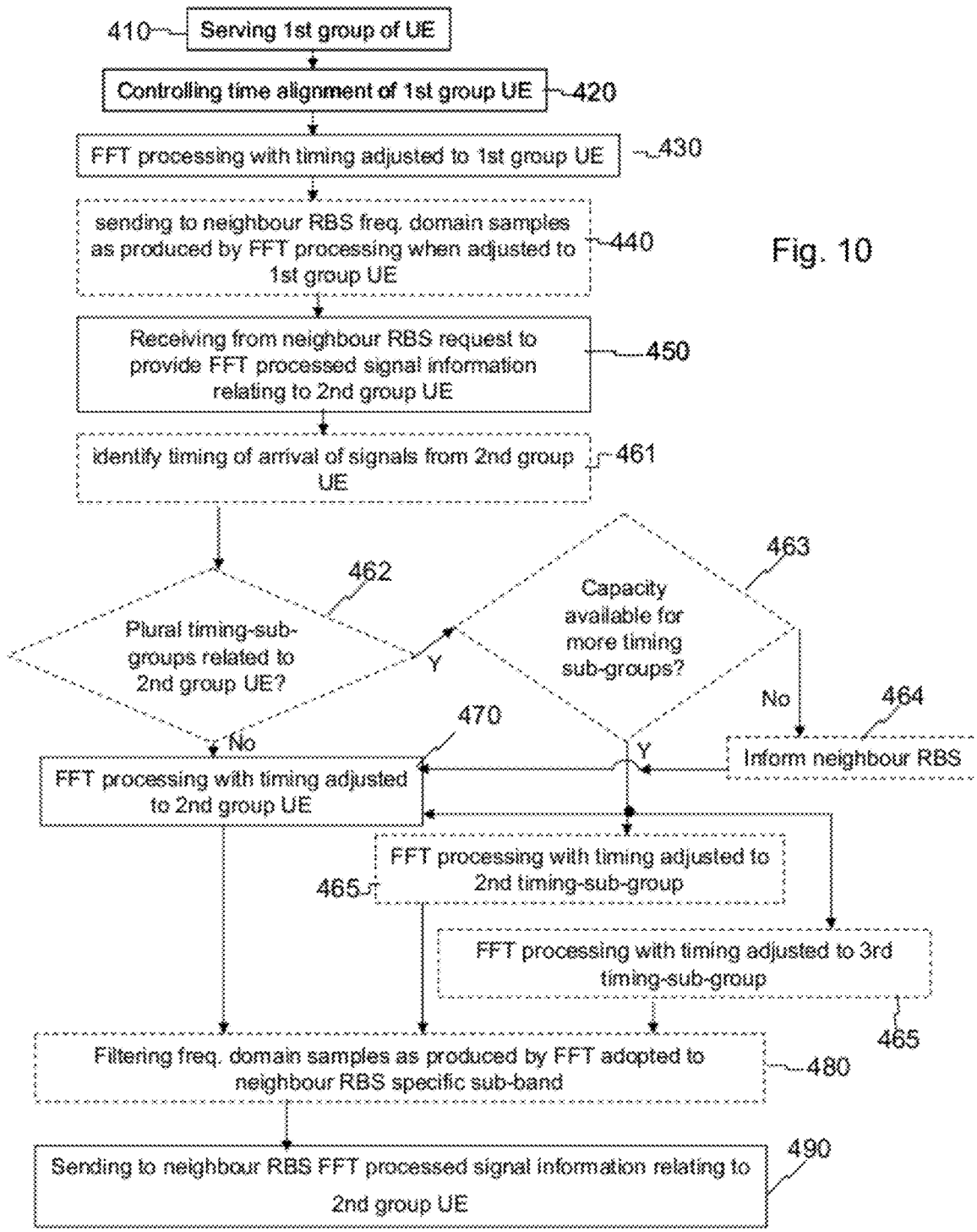
FIGS. 10-13 are flowcharts of methods.

In the flowchart of FIG. 10, the first 3 steps 410-430 are the same as disclosed in FIG. 5 and that relates to the Fourier processing of signals from the first group of UE that is served by the second radio base station 20. In a fourth optional step the second radio base station 20, sends 440, frequency domain samples to one or more of its neighbour radio base stations 10, 30. The frequency domain samples are those produced with the Fourier processing adjusted in time to the arrival of the first group UE 21, and are available at the output of an FFT processor 143, in the second radio base station 20. These samples may be used by any of the neighbour radio base stations, such as first and third radio base stations 10, 30 to identify presence of a strong signal from one of its served UE 11, 31. These samples may also be used by any of the neighbour radio base stations 10, 30 to identify arrival timing at the second radio base station, 20, of the signal transmitted from any of the UE, 11, 31 that are served by the neighbour radio base station 10, 30.

The second radio base station 20, then receives, 450, a request to provide FFT processed signal information relating to a second group of UE 11, 31, from one of its neighbour radio base stations 10, 30. The second group UE, 11, 31, is located within the cell served by the requesting radio base station 10, 30 and may comprise one or more UE 11, 31. The request includes at least one of:
  An indication of an expected arrival timing at the second radio base station 20 of the signals from the second group UE 11, 31. If the neighbour base station, 10, 30, has received frequency domain signal samples in a previous step such as in step 440, then the neighbour base station may include the timing information in the request.
  Information on the properties of the signal sent from each of the second group UE. Such information is UE specific and may for example be any of; a sounding reference signal, a demodulation reference signal, a spreading code and a random access preamble.

The request may optionally also specify time slots in which the second group UE 11, 31 may be scheduled. The requested FFT signal information relating to the second group UE, will probably be the frequency domain samples produced at the output of a FFT processor that demodulates the OFDM signal, while alternatively soft values of the estimated modulation symbols $\hat{a}_0$-$\hat{a}_{M-1}$ relating to the second group UE may be the signal information requested.

In the next step is identified 461, the arrival timing of signals from the second group UE 11, 31. This step is needed if the request does not include the timing information, while if time arrival information is included in the request it may be omitted. The identification of the arrival is made by identifying the specific signal from each of the UE, based on any of the sounding reference signal, the demodulation reference signal, the spreading code or the random access preamble.

When the timing of the arrival of the second group UE has been identified, it is identified 462, whether the arrival of signals from UE in the second group can be considered to be aligned or if they relate to two or more timing-sub-groups. Even if the second group UE comprises two or more UE they are considered time aligned if the maximum time difference corresponds to that of the cyclic prefix $T_{CP}$ of the ODFM symbol period. If the arrival of signals is more scattered in time, the arrival timings are grouped with signals that are considered mutually time aligned. The number of groups is desired to be as low as possible.

If the arrival timing of signals from the second group UE is not related to two or more timing-sub-groups, the step following is Fourier processing 470, with the timing adjusted to the arrival of the signals from the second group UE. In the example it is assumed that the radio base station currently has no other active FFT process for serving a previous received request from any of the neighbour radio base stations 10, 30 and there is Fourier processing means free to use for the first arrived UE of the second group.

Should however, in step 462, more than one timing-sub-group be found, the next step will be check, 463, of the capacity available for Fourier processing all the timing-sub-groups related UE signals. If there is capacity available, then a Fourier processing, 470, 465 is started with timing adjusted to each of the timing-sub-groups associated with the second group UE 11, 31.

If there is not capacity available for processing signals relating to all the timing sub-groups, the requesting one of the neighbour radio base stations 10, 30 is informed 464. Optionally, Fourier processing 465, is started with the processing of the number of timing-sub-group signals as there is capacity for handling.

When the capacity 463 is checked and FFT processing 470, 465 is started the FFT processing may optionally be assigned to different timing sub-groups in different time slots such as is discussed above in connection to FIG. 8. Unless having received specific timing information for specific time slots, the assisting radio base station then informs the requesting radio base station 10, 30, of at least one of:
  The timing-sub-group that each UE is related to and the time slots assigned for processing each timing-sub-group UE.
  The Fourier processing timing in the various time slots.

Other neighbour base stations 10, 30 than the requesting one are optionally also informed of the Fourier processing timing in the various time slots.

After the Fourier processing 470, 465, the step of filtering 480 the frequency domain samples, such that only physical resource blocks that carries the second group UE passes through the filter, is optionally performed. Preferably the filter is adapted to each of the Fourier processors and to the signals from UE related to the timing-sub-group handle by that Fourier process. The advantage is reduction in the amount of signalling information to be sent to the requesting radio base station 10, 30.

In the last step the signalling information relating to the second group UE 11, 31, is sent to the radio base station 10, 30 that requested assistance from the second radio base station 20. As explained above the signalling information sent can be the frequency domain samples produced at the output of a FFT processor performing the Fourier processing of OFDM demodulating the signals from the second group UE. Alternatively the frequency domain signals are further processed before being sent, 490, in a step not depicted in FIG. 10 and preceding the sending 490 step. The process of estimating the modulation symbols in the signal from an UE will be described further down in connection to the structure of the radio base station 10, 20, 30, and further examples given on what the signalling information may consist of.

Figure 11:
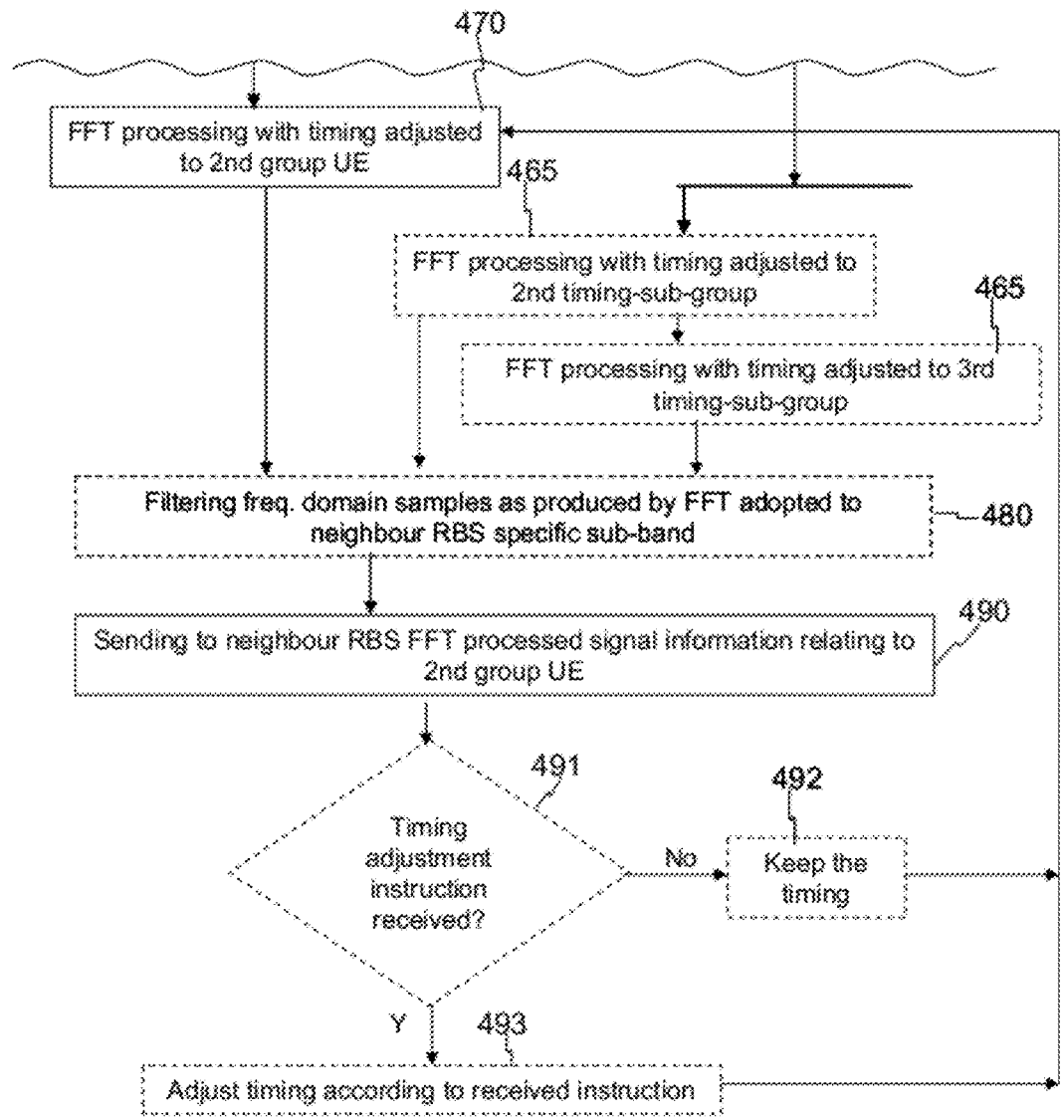

Unless the request received 450 from the neighbour radio base station indicated a period for the assistance in receiving the signal from the second group UE, the second radio base station 20 will continue in assisting. Optionally, the requesting radio base station 10, 30 and the assisting radio base station communicates and tunes the timing of the FFT processing to better fit the arrival of signals from the second group UE 11, 31 at the assisting radio base station 20. Then the method as disclosed in FIG. 10 may optionally include three further steps at its end. This is disclosed in the flowchart of FIG. 11, and that starts in the middle of the flow of FIG. 10. All the steps of FIG. 10 could not fit into one sheet end therefore only the last half is shown. The three additional steps is check if further timing adjustment instruction is received 491 from the requesting radio base station 10, 30, if so the timing of one or more of the Fourier processes is adjusted 493, and Fourier processing is continued in a loop. If no timing adjustment instruction is received the previous timing is kept 492, and Fourier processing is then continued in a loop. A reason for adjusting the timing may be some of the second group UE is moved to a new location, and the propagation delay to the assisting radio base station 20 changes. Another reason is assistance from the second radio base station is no longer needed for receiving the signal of some of the second group UE. Yet another reason may be that the radio base station 10, 30 that request assistance may provide time alignment command to the UE, 11,31 such that the signal from it may arrive within one of the timing-sub-groups already supported by the assisting radio base station. This is possible because of the cyclic prefix length allows for some adjustment arrival timing in both the serving cell, i.e. cell A or cell C, and in the cell of the assisting radio base station 20.

In case of the Fourier processing capacity is occupied for assisting in receiving signals in most of the time slots, when more requests are received from neighbour radio base stations, there is a need for more elaborated method for evaluating which of the request shall be handled, which shall be denied and the extent to which the requests are served. One such option is to add a weight that indicates the urgency of obtaining assistance for receiving the signal of a specific UE 11, 31 or urgency of getting assistance in receiving signals that relates to a specific timing-sub-group. The weight may relate to whether the signal from the specific UE may be possible to detect or not, may relate to how much the signal from UE is improved by the assistance from second radio base station 20, and or may relate to how many UE that are associated with the relevant timing-sub-group. The assisting radio base station 20 assigns the Fourier processing resources depending on the urgency weight of the requests. A Fourier process may be reassigned for receiving signal relating to another timing sub-group, if a later received request has higher urgency than that of a previously received request. Since the timing of the Fourier processing is optionally variably adjustable in the different time slots, the adaptation of the assignments to the need of assistance may be selected to be more or less complex.

Figure 12:
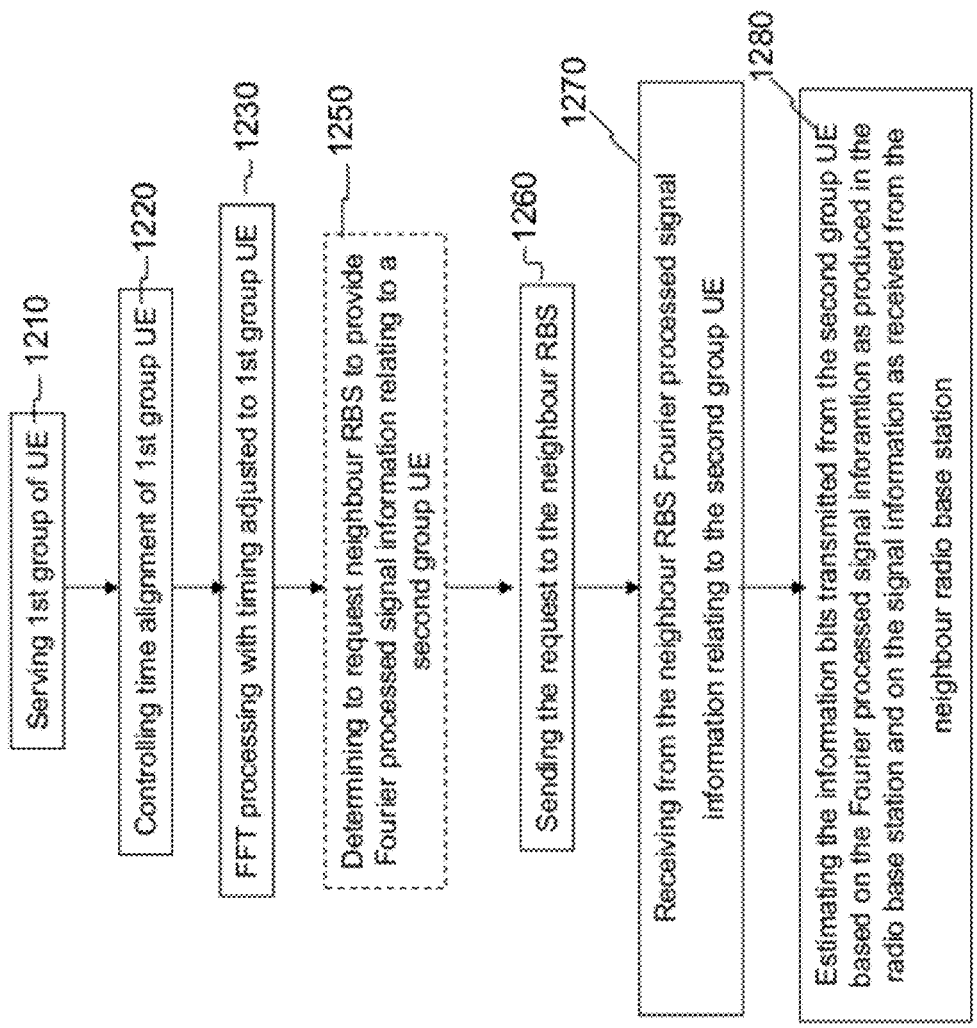

The procedure described above has mainly been from the perspective of the radio base station 20 assisting one of is neighbour radio base stations. FIG. 12 is a flowchart of the method as performed in a radio base station obtaining assistance from one of its neighbour radio base stations in receiving signals from one or more of the UE served by the radio base station obtaining assistance. In the example the radio base station obtaining assistance may be the first radio base station 10 as is disclosed in FIG. 1a, and it serves 1210, a first group of UE 11, 12 in cell A with communication. The radio base station, 10, controls, 1220, the timing of arrival of signals from the first group of UE 11, 12, by sending a time alignment command to any UE 11, 12 in the first group whose signal arrives misaligned at the radio base station 10. The radio base station, 10, performs Fourier processing, 1230, of the signals received from the first group of UE, 11, 12, typically with one FFT processor with its start of the processing tuned to the arrival of signals from the first group of UE11, 12. One or more of the UE, 11, in the first group UE 11, 12 are located on the edge of cell A, with result the radio base station 10 has difficulty in decoding the signal from the cell edge UE, 11. In this description the one or more UE, 11, on the cell edge are called the second group UE, 11, and is a sub-group of the first group UE served by the first radio base station, 10. Based on the difficulty in detecting the signals from the second group UE, 11, the first radio base station, 10, determines, 1250, to request a neighbour radio base station of assistance in receiving the signals from the second group UE. In the example the radio base station, 10, selects the second radio base station, 20, serving cell B, as the best candidate for providing assistance. The selection of the second radio base station, 20, is made according to any of:

By chance

Based on measurements performed by the second group UE, 11, on other cells than the serving cell A, and reported to the serving radio base station, 10.

Based on time domain samples previously received from the neighbour radio base station. This last alternative will be further explained in connection to FIG. 13.

Since the selection can be made by chance the selection can be seen as an optional step.

The first radio base station sends, 1260, a request, for assistance in receiving signals from the second group UE, to the second radio base station, 10. In following step the first radio base station, 10, receives, 1270, Fourier processed signal information relating to the second group UE 11. The Fourier processed signal information is typically the Frequency domain samples as outputted from a FFT processor that is tuned to the arrival of signals from the second group UE 11. Alternatively, soft values of estimated modulation symbols are received as Fourier processed signal information. In the last step, the information carried by the signals from the second group UE, 11, is estimated 1280. The estimation is based on the Fourier signal information as received from the assisting radio base station, 20 and as produced in the serving radio base station, 10. For each set of Fourier signal samples, if consisting of Frequency domain samples, and for each UE 11 in the second group, a channel estimation is made. The two sets of frequency domain samples are then equalized and combined, de-mapped and decoded, and thereby estimation is produced of the information bits as transmitted from the second group UE 11. After combination of the Frequency domain signals, the steps following, i.e. the de-mapping and the decoding are made in the same way as if Fourier processed signal samples produced in the serving base station were the input to the processing steps. Should soft values of estimated modulation symbols be received from the assisting radio base station, 20, an estimation of the modulation symbols as transmitted from the second group UE is made based on a combination of the soft values as received and of soft values as produced in the serving radio base station, 10.

Figure 13:
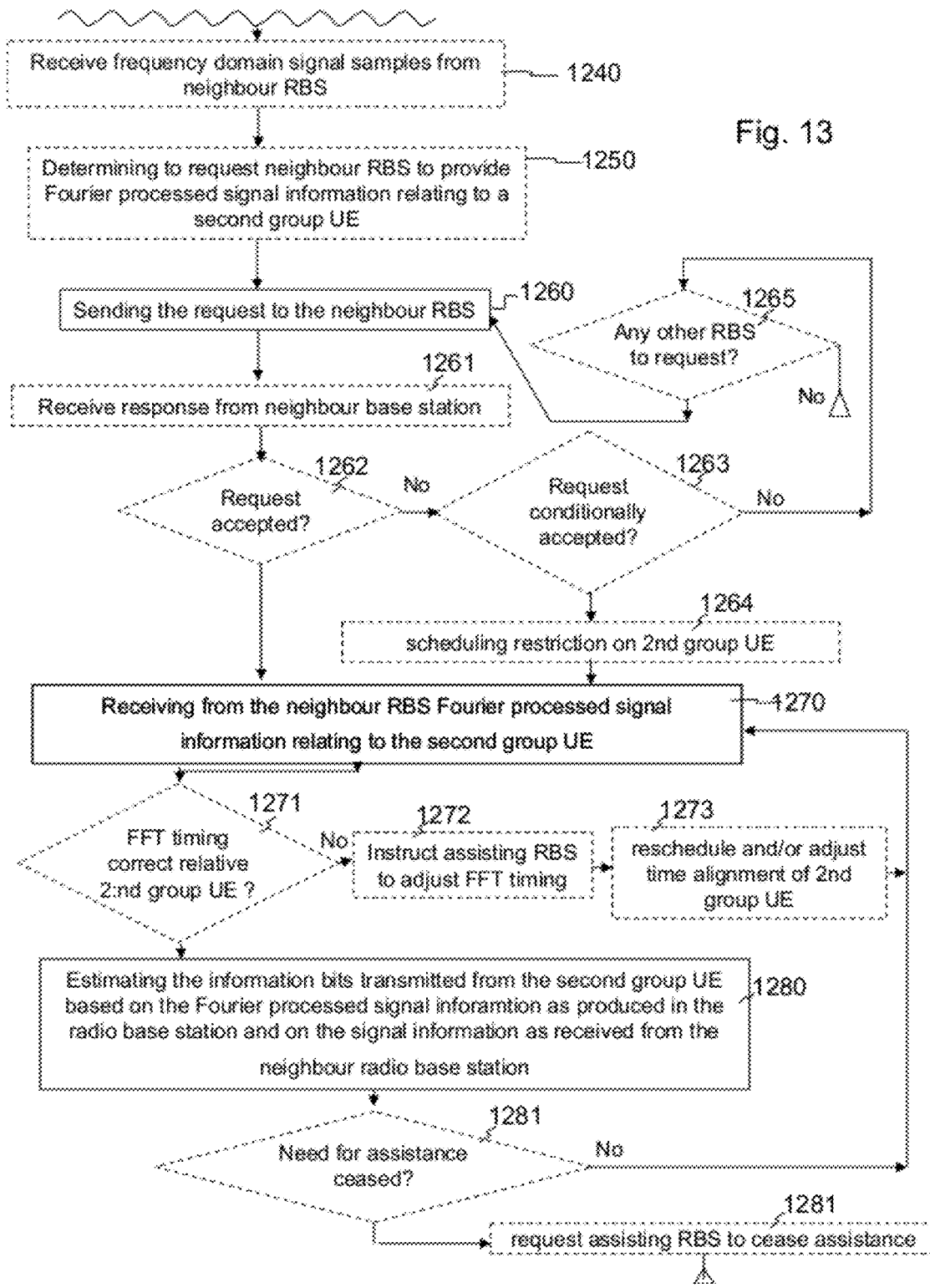

FIG. 13 is a further flowchart of method steps performed in the first radio base station, 10, serving the second group UE, 11. It includes all the steps of the flowchart of FIG. 12, albeit the first three steps of FIG. 12 are not depicted in the flowchart of FIG. 13 owing to lack of space in the sheet. They should nevertheless be understood to be included. In addition to the steps disclosed in FIG. 12, FIG. 13 discloses some optional steps. The first of the optional steps is reception, 1240, of frequency domain signal samples from a neighbour radio base station, for example the second radio base station 20 serving cell B as depicted in FIG. 1*a*. The frequency domain samples received are typically produced in the second radio base station, 20, when detecting signals from UE, 21, that it serves with communication, or alternatively frequency domain samples produced upon request from some other radio base station, 30. The radio base station,10, use these frequency domain signal samples to identify the presence of strong signal from the second group UE, 11, and or use the frequency domain samples to identify the arrival timing in the neighbour radio base station, 20, of signals from the second group UE, 11. When the first radio base station, 10, in next step determines, 1250, to request the second radio base station, 20, to assist in receiving signal from the second group UE, 11, it may optionally base the selection of radio base station, 20, that serves cell B, on the identification of strong signals from the second group UE, 11, in frequency domain samples as received in step 1240. When the first radio base station, 10, sends 1260, the request, it may optionally include an instruction on when the Fourier processing should be started, if step 1240 has been performed. Otherwise the information on the UE specific properties of the signals from the second group UE, 11, such as any of the sounding reference signal, the spreading code, a demodulation reference signal and a random access preamble is included in the request. The UE specific signal properties may be included also if timing instruction is included in the request.

Optionally, a response to the request is received, 1261, from the second radio base station, 20. It is checked, 1262, if the request is accepted, and if it is, the first radio base station, 10, receives Fourier processed signal information from the second radio base station, 20.

If however, the request is conditionally accepted, check is made in step 1263, and in the example the condition is Fourier processing of the second group UE, 11, signals can only be made in some time slots. The first radio base station, 10, then restricts, 1264, scheduling so that the second group UE, 11, can only be scheduled in predefined time slots or sub-frames. The first radio base station, then receives, 1270, Fourier processed signal samples relating to the second group UE. Should the request not be accepted at all by the second radio base station, 20, the first radio base station, checks 1265, if there is any other neighbour radio base station suitable for assisting in the radio reception. If not the process is ended. If there is another candidate for assisting, a further request is sent, 1260, to the other candidate radio base station. The steps following upon step 1260 will then continue in a loop.

When Fourier processed information is received, 1270, from the second radio base station, 20, it is optionally checked whether it is produced with Fourier processing tuned to the arrival of the second group UE, 11, signals. If the Fourier process signal information consist of frequency domain signal samples the start of the OFDM symbols can be found and so also any misalignment in the timing of the Fourier processing. Should there be a misalignment in time, an instruction, 1272, to adjust the Fourier processing timing is sent to the second radio base station, 20. Optionally also, or alternatively, some UE is re-scheduled. The re-scheduling may be to another time slot, if the timing of the second group UE relates to two or more timing-sub-groups, and due to movement of the UE position another timing-sub-group is better suited for the particular UE 11. Alternatively, in step 1273, one or more of the second group UE,11, is adjusted by a new time alignment value. If several UE,11, are related to the same timing-sub-group, and their arrival timings at the second radio base station, 20, are scattered, they may be somewhat less scattered by timing alignment control from the serving radio base station, 10. By doing so the first radio base station may decrease the scattering at the second radio base station, 20, at the expense of some more scattering in the arrival timing at the first radio base station, 10. As long as the maximum scattering is no more than the cyclic prefix, the serving base station, 10, can afford this expense.

In the last step the serving radio base station, 10, checks, 1281, its need for further assistance. If there is a need, the radio base station continues receiving Fourier processed signal information, in step 1270, and the process continues in a loop. Should it however, be detected there is no further need for assistance, the assisting radio base station is requested, 1281, to cease providing Fourier processed signal information. The procedure is then ended.

What has not been depicted in figure, 13, is the first radio base station, 10, upon having sent a first request, may send further request to the second radio base station, 20, for assistance in receiving signals from second group UE11. The further request typically relates to further UE that has been decided by the serving radio base station, 10, to be included in the second group. The second group UE, 11, may then include plural UE,11, related to several timing-sub-groups and that may have restrictions to be scheduled only in some of the sub-frames. The serving radio base station may then run in parallel several processes as the one depicted in FIG. 12 or in FIG. 13.

Figure 14:
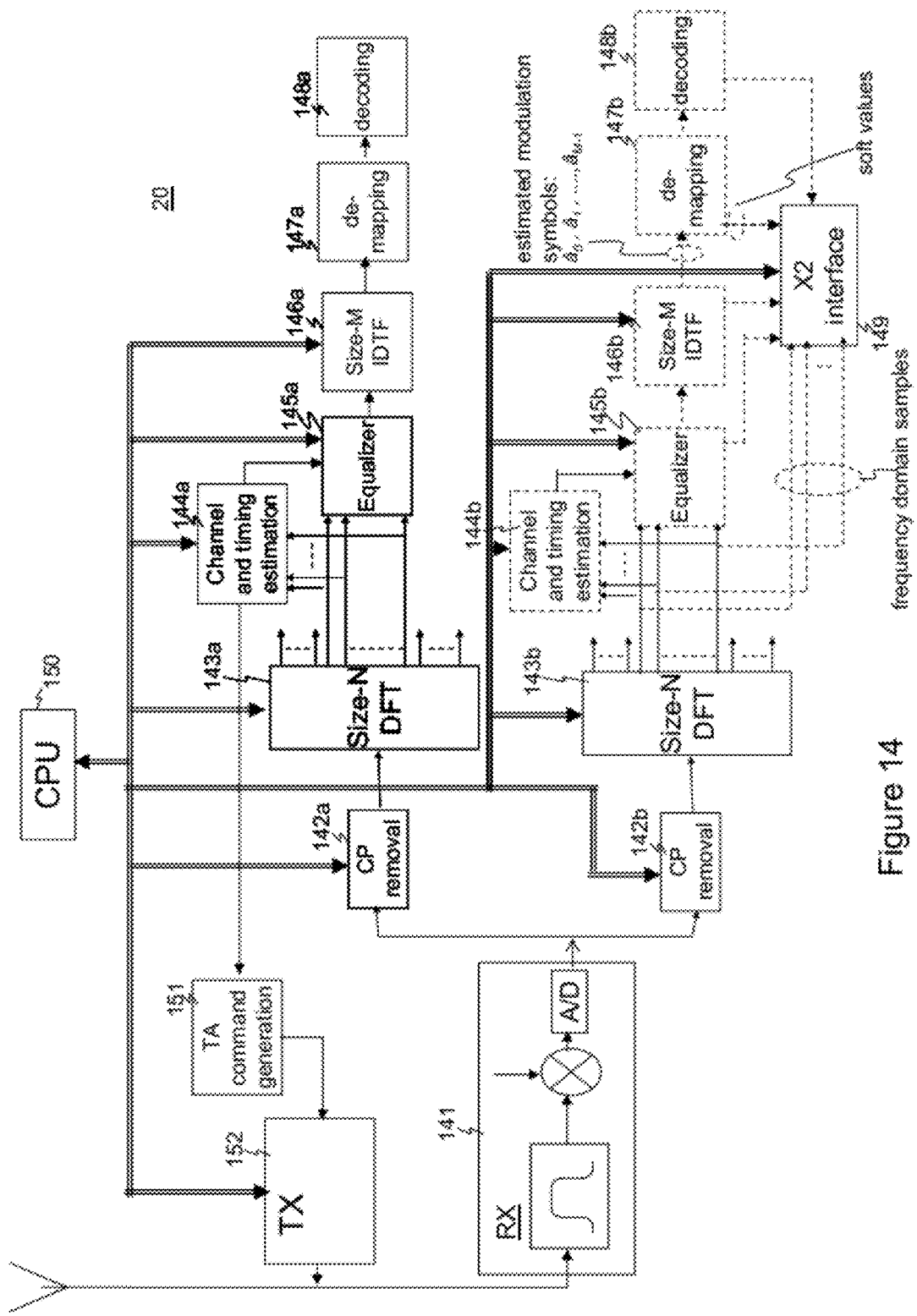
FIG. 14 is a block diagram of a radio base station.

The structure of a radio base station adapted for assisting a neighbour radio base station in radio reception will now be described with reference to FIG. 14. In the examples above the second radio base station, 20, serving cell B, has acted assisting radio base station and we will continue with this example, however, it should be understood that any of the radio base stations, 10,20, 30, in the system may be adapted to have the capability of assisting any of its neighbours upon request. In the block diagram of FIG. 14, are depicted only those blocks that are important for the embodiments disclosed, and it should be understood that a radio base station is much more complicated and involves more parts than those described here. The radio base station, 20, comprises a radio receiver, 141, that receives the radio energy from an antenna and functions to filter the frequency carrier, frequency transposes the filtered carrier bandwidth from radio frequency to a lower frequency, samples the signal and produce at its output a sequence of time discrete signal samples of the frequency carrier. The sequence is feed to a cyclic prefix remover, 142*a*, followed by a DFT (Discrete Fourier Transformer), 143*a*, their functions have been described in connection to FIGS. 2*a*-3*b*, and at the output of the DFT, 143*a*, frequency domain signal samples are produced. These frequency domain signals samples are separated depending on from what UE they were received, and fed to a unit, 144*a*, arranged for performing channel and timing estimation for signals from respective of the UE. In this example the UE, handled by the first receiver chain, 142a-148a, are intended to be a first group of UE, 21, served by the second radio base station, 20. The frequency domain signal samples of respective first group UE, 21, are also feed to an Equalizer, 145a, that by use of the channel estimate of respective UE path as received from the channel estimation unit, 144a, collect energy from paths propagated by the desired signal from respective of the first group UE, 21. The Equalized signals are fed to an IDTF, 146a, followed by a de-mapping unit, 147a, and a decoding unit 148a. The de-mapping unit produces soft values of possible modulation symbols of the signals and the decoder produce an estimation of the information bits as sent from respective UE of the first group, 21. The radio base station also comprises a transmitter, 152, a timing command generator, 151, and a central processor, 150, run by software and arranged to control the operation of the other units in the radio base station, 20. The timing command generator, 151 has an input from the unit, 144a, for channel and timing estimation, and if a signal from a UE is received misaligned it sends a time alignment instruction via the transmitter, 152, to the UE. The radio base station, 20, also comprises an interface, 149, for communication with other radio base stations, 10, 30. In LTE the protocol used for communication between the radio base stations is named X2, and therefore the interface, 149, for communication with other radio base stations, is commonly called X2 interface.

The description of the second radio base station so far corresponds to that of a well known radio base station. What makes the radio base station specifically adapted for assisting a neighbour radio base station is an additional cyclic prefix remover 142b, followed by an additional DFT, 143b. There is a connection for feeding the frequency domain signal samples as produced by the additional DFT, 143b, to the interface 149, for further transmission to another requesting radio base station, 10, 30. The adjustment in time of the Fourier processing in the DFT, 143b, is controlled from the CPU, 150, if timing instructions is received with the request from another radio base station, 10, 30, for providing assistance, Alternatively the radio base station also comprises an optional further unit, 144b, for channel and timing estimation. This unit, 144b, will then produce a timing estimate for signals of the second group UE, 11, and the Fourier processing in the DFT, 143b, based on the timing estimate as received from unit 144b, be adjusted to fit the arrival of the second group UE signals. This requires that the UE specific properties of the second group UE signals has/have been received from the first radio base station, 10, 30. The central processor, 150, controls the operation of sub-sequent time slots, and updates the receiver chains on the timeslot changes. Thereby the timing of the Fourier processing may be adapted to different timing-sub-groups in different time-slots. Optionally the additional DFT, 143b, is followed also by an equalizer, an IDTF, 146b, a de-mapper, 147b, and a decoder, 148b. When comprised with these optional units, 145b-148b, the signaling information that is sent to the requesting radio base station, 10, 30, in addition to or alternatively to the time domain signal samples may comprise Equalized frequency domains samples Estimated modulation symbols, as are output from the IDTF, 146b

Soft values of the estimated modulation symbols, as are output from the de-mapper 147b

Decoded information bits

So far, and in FIG. 14, just one additional DFT, 143b, has been disclosed for receiving signals from second group UE, 11, i.e. signals from UE served by the first radio base station, 10, 30. It should however be understood that further additional DFTs, 143b, with cyclic prefix remover, 142b, and optionally also following signal processing units, 144b-148b, may be added in parallel. The radio base station may assist in receiving signals from second group UE relating to several timing-sub-groups. When the UE of the second group are carefully scheduled with UE of the same timing sub-group in the time slots, it is expected that some few additional DFTs, 143b can assist a plurality of neighbour cells in the reception of signals from UE, 11, 31, on the cell border. The DFTs, 143, is typically implemented by FFTs (Fast Fourier Transformation processors), however also other types of processors are possible to use. Moreover, TA command generation, Fourier processing, the channel and timing estimation, the Equalizing, the IDTF processing, de-mapping and decoding need not be made in separate units or processors. Their functions can be handled by a common processor, or be split on two or more processors that each handles some of the functions. A radio base station with physical blocks that corresponds to those in FIG. 14 is one of plural possible implementations. Several, physical structures are feasible, and that is why the blocks depicted in FIG. 14 should be read as being functional blocks.

Those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method in a radio base station of assisting one or more neighbour radio base stations in UL signal reception, the method comprising the steps of:

serving a first group of UE with communication over a frequency carrier;

controlling timing of signal transmission from the first group of UE to be aligned at arrival at the radio base station, by sending a time alignment value to any UE in the first group whose signal is misaligned at arrival;

Fourier processing time domain signal samples of the frequency carrier, with timing of the Fourier processing adjusted to the timing of arrival of signals from the first group of UE, and thereby producing Fourier processed samples relating to the first group of UE;

receiving a request from one of said neighbour base stations to provide Fourier processed signal information, relating to a second group of one or more UE that is/are served by the requesting neighbour base station wherein the signal/s from the second group of UE arrive/s at the radio base station non-aligned with the signal/s of the first group of UE;

Fourier processing time domain signal samples of the frequency carrier with timing adjusted to the arrival of signal/s from the second group UE, thereby producing Fourier processed signal information relating to the second group UE; and sending the Fourier processed signal information that relates to the second group UE to the requesting neighbour radio base station.

2. A method according to claim 1, wherein the received request comprises an indication of the timing for the Fourier processing of signals from the second group of UE.

3. A method according to claim 1, wherein the received request comprises UE specific properties in the transmitted signal from the second group UE, wherein the radio base station identifies the timing of the arrival of signal/s from the second group UE based on said UE specific properties of the signal.

4. A method according to claim 3, wherein said UE specific properties in the signal comprises at least one of: a sounding reference signal, a demodulation reference signal, a spreading code, a random access preamble.

5. A method according to claim 1, wherein time at the radio base station is structured into a series of time slots and that are grouped into frames that each include a sequence of predefined number of the time slots, and the timing of the Fourier processing of the second group UE is not the same in all time slots of the frame.

6. A method according to claim 5 wherein Fourier processing in a time slot is adjustable to two or more timings, with separate Fourier processing being performed for each timing.

7. A method according to claim 5, comprising the further step of informing one or more of said neighbour radio base stations of the timing in the time slots of the Fourier processing of the second group UE.

8. A method according to claim 1, wherein time at the radio base station is structured into a series of time slots and that are grouped into frames that each include a sequence of predefined number of the time slots, and the received request indicates one or more time slots in which the signal/s from the second group UE arrives, and wherein the Fourier processing of the second group UE is performed for the indicated time slots of the frames.

9. A method according to claim 1, comprising receiving an additional request from another neighbour base station than that which sent the previous request, wherein the additional request is to provide Fourier processed signal information relating to one or more UE of the second group of UE and that is/are served by the neighbour base station from which the additional request is received, and performing the steps of Fourier processing the signals on the carrier and sending the Fourier processed signal information thereby produced to the radio base station from which the additional request was received.

10. A method according to claim 1, wherein the received request/s indicates one or more group/s of sub-carriers of the frequency-carrier that is/are used by the second group UE, and selecting output data from the Fourier processing that relates to the indicated group/s of sub-carriers for the sending to the requesting neighbour base station.

11. A method according to claim 6, wherein the second group of UE comprises plural UE and the timing of arrival of signals from the second group UE is divided into to two or more timing-sub-groups, such that if signals from two or more of the second group UE relate to the same timing-sub-group the signals arrive mutually aligned while signals relating to separate timing-sub-groups arrive non-aligned at the radio base station, wherein separate Fourier processing are made for the timing-sub groups of signals and adjusted to the timing of the timing- sub-groups.

12. A method according to claim 11, wherein when Fourier processing is assigned to be made with timing adjusted to the first timing-sub-group and arrival of signal/s from some of the second group UE relates to the second timing-sub-group, before starting the Fourier processing adjusted to the second timing-sub-group, checking the capacity to perform the Fourier processing according to the request previously received in respect of the UE relating to the second timing-sub-group, and performing the Fourier processing adjusted to the second timing-sub-group if there is capacity.

13. A method according to claim 12, wherein if there is a lack of capacity for the Fourier processing to be adjusted according to the second timing-sub-group, sending information on the lack of capacity to the neighbour radio base station that sent the request that relates to the second group UE whose signal arrival timing is within the second sub-group.

14. A method according to claim 13, wherein the information indicates time slots were there is Fourier capacity.

15. A method according to claim 13, wherein the information indicates timing of one timing-sub-group closest in time to that of the second timing-sub-group.

16. A method in a radio base station of obtaining assistance from a neighbour radio base station in receiving a signal from one or more UE, comprising the steps of, serving a first group of UE with communication on a frequency carrier, controlling the timing of signals from the first group of UE to be aligned at arrival at the radio base station, by sending a timing alignment value to any UE in the first group whose signal arrives misaligned;

Fourier processing the signals on the frequency carrier, with timing adjusted to the arrival of the signals from the first group of UE, thereby producing Fourier processed samples relating to the first group of UE;

sending a request to the neighbour radio base station to provide Fourier processed signal information relating to a second group of UE which comprises one or more UE of the first group, wherein the request further includes at least one of, an indication of the timing of arrival at the neighbour radio base station of signals from the second group UE, and UE specific properties of the signals/s transmitted from the second group UE;

receiving from the second neighbour radio base station Fourier processed signal information relating to the second group UE;

estimating the information bits transmitted from the second group UE based on the Fourier processed signal information as produced in the radio base station and based on the Fourier processed signal information as received from the second radio base station.

17. A method according to claim 16, wherein the UE specific properties of the signal comprises at least one of; a random access preamble, a sounding reference signal, a demodulation reference signal, a spreading code.

18. A method according to claim 16, comprising the further step of, estimating the timing of arrival of the signal/s from the sub-group UE at the neighbour radio base station and including the estimated timing in the request sent to the second radio base station.

19. A method according to claim 18, wherein the indication of timing of arrival at the neighbour base station of the second group UE signals, is based on frequency domain samples as received from the neighbour radio base station prior to the request is sent.

20. A method according to claim 16 wherein the indication of timing of arrival at the neighbour base station of signals sent from second group UE, is based on estimated timing as is received from the second group UE.

21. A method according to claim 16 wherein prior to the sending step is performed the step of:

determining to request the neighbour radio base station to provide Fourier processed signal information relating to signal/s from a second group UE that comprises one or more UE of the first group, wherein the determination is based on the quality of the UL communication with the second group UE and/or based on an estimation that the neighbour radio base station will be able to receive signals from the second group UE.

22. A method according to claim 16, wherein the second group of UE comprises plural UE and the timing of arrival at the neighbour radio base station of signals from the second group UE relates to two or more timing-sub-groups, such that if signals from two or more of the second group UE relate to the same timing-sub-group the signals arrive mutually aligned while signals relating to separate timing-sub-groups arrive non-aligned at the radio base station, comprising the further step of scheduling UL transmission of the second group UE such that the second group UE that are granted to transmit in the same timeslot relate to a restricted number of timing sub groups.

23. A radio base station for assisting a neighbour radio base stations in UL signal reception, and that comprises;

an interface for communicating with the neighbour radio base station, a radio receiver, a radio transmitter, a processor connected to the radio receiver and to the radio transmitter and when run by computer program configured to support communication with a first group of UE over a frequency carrier and control the timing of arrival of signals from a first group of UE by sending a timing alignment command to any UE of the first group whose signal arrive misaligned at the radio base station, further is/are said processor and/or one or more further processors equipped with computer software and when run on said processors they are operable to;

Fourier process samples of the frequency carrier with timing adjusted to the arrival of the time aligned signals of the first group of UE;

Fourier process samples of the frequency carrier with timing adjusted to the arrival of signals from a second group UE, in response to a request from said neighbour base station and wherein signals from the second group UE arrive at the radio base station non-aligned with the signals from the first group UE; and sending to the neighbour radio base station Fourier processed signal information relating to the second group UE.

24. The radio base station of claim 23, wherein the arrival of signals of the second group UE relates to several timing sub-groups, and wherein the Fourier processing timing is adjustable to several of these timing sub-groups, with separate Frequency processes being performed for each of the sub-groups that the timing is adjusted to.

25. The radio base station of claim 24 wherein time at the radio base station is structured into series of time slots and wherein the Fourier processing is adjustable to one or more of said timing sub-groups the time slots, and adjustable to different of the timing sub-groups in different of the time slots.

\* \* \* \* \*